(12) United States Patent
Cannon et al.

(10) Patent No.: US 6,868,155 B1
(45) Date of Patent: Mar. 15, 2005

(54) OFF-HOOK VISUAL MESSAGE WAITING INDICATOR

(75) Inventors: Joseph M. Cannon, Harleysville, PA (US); James A. Johanson, Macungie, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/412,178

(22) Filed: Oct. 5, 1999

Related U.S. Application Data

(63) Continuation-in-part of application No. 09/300,109, filed on Apr. 27, 1999, now Pat. No. 6,529,587.

(51) Int. Cl.[7] .......................... H04M 1/64; H04M 1/56; H04M 1/00; H04M 3/00
(52) U.S. Cl. ............... 379/376.01; 379/88.11; 379/88.21; 379/88.26; 379/142.08
(58) Field of Search ................ 379/67.1, 77, 88.18, 379/88.22, 89, 142.01, 215, 376.01, 387, 88.11, 88.12, 88.19, 88.2, 88.25, 88.26, 142.08, 142.17, 207.07, 376

(56) References Cited

U.S. PATENT DOCUMENTS

| | | | | |
|---|---|---|---|---|
| 5,363,431 A | * | 11/1994 | Schull et al. | 379/88.12 |
| 5,521,964 A | * | 5/1996 | Schull et al. | 379/88.12 |
| 5,764,758 A | * | 6/1998 | Shen | 379/372 |
| 5,802,166 A | * | 9/1998 | Garcia et al. | 379/372 |
| 5,943,407 A | | 8/1999 | Davis et al. | 379/142 |
| 5,982,774 A | * | 11/1999 | Foladare et al. | 370/401 |
| 6,219,414 B1 | * | 4/2001 | Maciejewski et al. | 379/215.01 |
| 6,266,524 B1 | * | 7/2001 | Dee et al. | 455/406 |
| 6,278,771 B1 | * | 8/2001 | Crockett et al. | 379/88.02 |
| 6,353,611 B1 | * | 3/2002 | Norris et al. | 370/356 |
| 6,366,772 B1 | * | 4/2002 | Arnson | 455/415 |
| 6,498,841 B2 | * | 12/2002 | Bull et al. | 379/142.08 |
| 6,529,587 B1 | * | 3/2003 | Cannon et al. | 379/88.18 |
| 6,567,854 B1 | * | 5/2003 | Olshansky et al. | 709/229 |
| 6,584,506 B1 | * | 6/2003 | Perlman et al. | 709/227 |
| 6,614,890 B2 | * | 9/2003 | Perlman et al. | 379/93.24 |
| 6,628,779 B1 | * | 9/2003 | Pietrowicz | 379/404 |
| 6,633,634 B1 | * | 10/2003 | Crockett et al. | 379/215.01 |
| 6,724,872 B1 | * | 4/2004 | Moore et al. | 379/93.35 |
| 6,775,357 B2 | * | 8/2004 | Crockett et al. | 379/88.02 |

* cited by examiner

*Primary Examiner*—Binh Tieu

(57) ABSTRACT

In a first embodiment of the invention, a method of providing a visual message waiting indicator signal to an off-hook telephone includes the step of receiving a voicemail message at a central location, and also includes the step of sending a visual message waiting indicator signal from the central location and destined for the off-hook telephone. In an alternative embodiment, a method of receiving a visual message waiting indicator signal in an off-hook telephone includes the steps of being in an off-hook condition, and receiving a visual message waiting indicator signal. This method may further include the step of displaying a visual message-waiting indicator based on the received visual message waiting indicator signal. This method may also include the step of receiving an alert signal, and the step of transmitting an acknowledgement signal in response to the alert signal. In another alternative embodiment, a telephone includes a visual message waiting indicator, and an interface unit adapted to couple the telephone to a network, such that the telephone is in an off-hook condition when coupled to the network and engaged in a communication activity, and is in an on-hook condition when coupled to the network and not engaged in a communication activity, wherein the interface unit is adapted to receive a visual message waiting indicator signal when in the off-hook condition.

23 Claims, 4 Drawing Sheets

OFF-HOOK VISUAL MESSAGE WAITING INDICATOR

This application is a continuation-in-part of U.S. application Ser. No. 09/300,109 on Apr. 27, 1999, now U.S. Pat. No. 6,529,587.

FIELD OF THE INVENTION

This invention is related to the field of telephony, and in particular to the field of alerting a user to a waiting voicemail message.

BACKGROUND OF THE INVENTION

There are two principal ways for a user to configure a home telephone system to provide a messaging service to an incoming caller. A first way is to have a telephone answering device, also known as an "answering machine" integrated into or coupled to a telephone at the user's home. Such a device will typically enter an off-hook or answered state after a predetermined number of unanswered rings associated with an incoming call, and then play an outgoing message (OGM) to an incoming caller, after which the incoming caller is offered the opportunity to record an incoming message. The answering machine has a drawback in that it cannot record a message if the telephone line is busy, i.e., the user is engaged in a previous call.

A second way is for the user to purchase a service from a telephone service provider wherein the telephone service provider will store incoming messages at a central location, and play the incoming messages to the user upon request. This second option is advantageous in that the OGM and recording activities occur between the central location and the incoming caller, and thus allow for the issuance of the OGM and recording of the incoming message, even if the target telephone is busy because the user is engaged in a previous telephone call.

A disadvantage of a user procuring messaging services from a service provider is that an incoming message may be waiting for the user and the user may not be aware of the stored incoming message. This can be contrasted with the traditional answering machine option, wherein the answering machine typically illuminates an LED or seven-segment display to inform the user of the existence of or number of stored messages. To overcome this drawback, a feature known as Voicemail Message Waiting Indicator (VMWI) was developed, wherein the service provider sends a signal to the user's telephone to cause it to illuminate an LED indicative of one or more waiting voicemail messages. This feature is described, for example, in BellCore Standard TR-NWT-001401, "Visual Message Waiting Indicator, Generic Requirements, FSD-01-02-2000, incorporated herein by reference.

A drawback of the traditional VMWI service is that it provides for the issuance of the VMWI signal only if the user's telephone is in an on-hook condition, i.e., is not engaged in a telephone call. If the user's telephone is off-hook, the traditional VMWI service waits until the telephone transitions to the on-hook state, and then provides the VWMI signal. Thus, if a user is engaged in a telephone call, the user will not be made aware of a new incoming message until after the telephone call is completed. This drawback may be of even greater magnitude if the telephone call is lengthy, because the standard allows for the VMWI signal to be dropped completely, i.e., not delivered, if there is a wait of more than 2.5 hours.

There is therefore a need for a VMWI service and apparatus that provides a VMWI signal even if a user's telephone is off-hook. There is also a need for a telephone adapted to receive a VMWI signal when off-hook, and to provide an indication of the receipt of the VMWI signal, such as the illumination of an LED, or the display of caller ID data associated with the message leaving party.

SUMMARY OF THE INVENTION

These needs are addressed by employing the present invention, a first embodiment of which is directed to a method of providing a visual message waiting indicator signal to an off-hook telephone. This method includes the step of receiving a voicemail message at a central location, and also includes the step of sending a visual message waiting indicator signal from the central location and destined for the off-hook telephone.

In an alternative embodiment, a method of receiving a visual message waiting indicator signal in an off-hook telephone includes the steps of being in an off-hook condition, and receiving a visual message waiting indicator signal. This method may further include the step of displaying a visual message waiting indicator based on the received visual message waiting indicator signal. This method may also include the step of receiving an alert signal, and the step of transmitting an acknowledgement signal in response to the alert signal.

In another alternative embodiment, a telephone includes a visual message waiting indicator, and an interface unit adapted to couple the telephone to a network, such that the telephone is in an off-hook condition when coupled to the network and engaged in a communication activity, and is in an on-hook condition when coupled to the network and not engaged in a communication activity, wherein the interface unit is adapted to receive a visual message waiting indicator signal when in the off-hook condition.

In yet another alternative embodiment, a telephone switch includes a message storage unit adapted to receive a voicemail message associated with a telephone when the telephone is in an off-hook condition, and a visual message waiting indicator signal transmission unit adapted to transmit a visual message waiting indicator signal to the telephone in the off-hook condition.

BRIEF DESCRIPTION OF THE DRAWINGS

Objects and advantages of the various embodiments of the invention will be apparent to one of skill in the art upon review of the following detailed description in light of the drawing, wherein.

DETAILED DESCRIPTION

Figure 1:
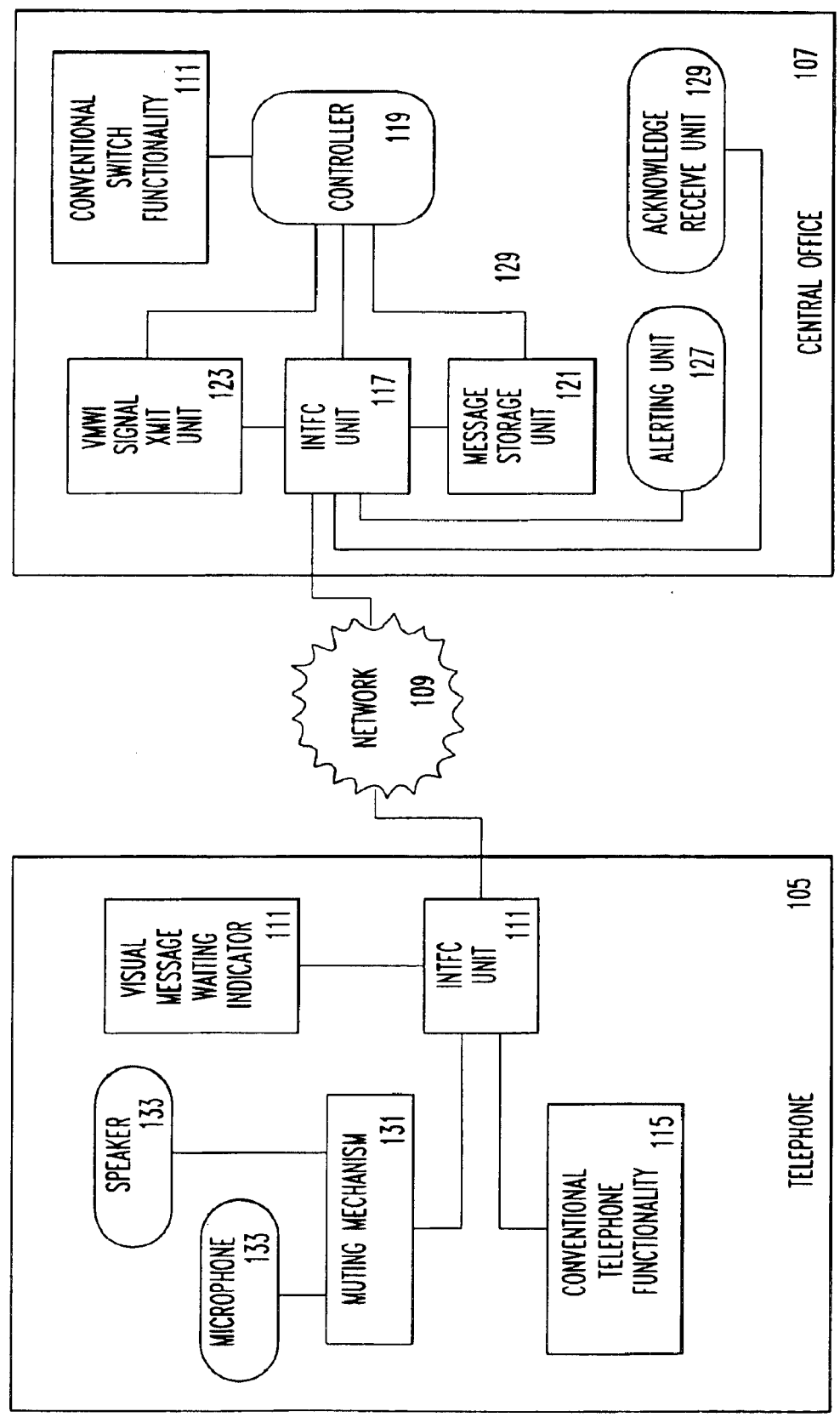
FIG. 1 is a simplified block diagram of a telephone and a central device coupled through a network according to a first embodiment according to the invention.

FIG. 1 depicts a simplified block diagram of a telephone 105 and a central device 107 coupled via a network 109. The network 109 may be any type of network, such as a public switched telephone network (PSTN), an internet, an intranet, any form of wired network or wireless network, etc. Similarly, telephone 105 may be any type of telephone, such as a corded telephone, a cordless telephone, a wireless telephone, a cellular telephone, a campus or PBX-based telephone, etc. Likewise, central device 107 may be a telephone switch of any type, an internet-based switch, a PBX, etc.

Telephone 105 includes an interface unit 111, a visual message waiting indicator 113, and conventional telephone functionality 115. Operationally, the interface unit 111, which may include, for example, a conventional telephone line interface, couples telephone 105 to the network 109 and is adapted, according to the invention, to receive a visual message waiting indicator signal when telephone 105 is in an off-hook condition. Accordingly, even if a user is engaged in a telephone call, or connected to an internet service provider to surf the web, or engaged in any other activity during which telephone 105 is off-hook, the user may still be alerted to the presence of one or more waiting messages stored at the central device 107 by the activation of the visual message waiting indicator.

It is well known, of course, that receiving conventional Caller ID data while engaged in a web-based activity via a modem will likely be fatal to any modem connection. In such a case, the user may be presented the option to turn off the off-hook feature of the invention, in a manner similar to that employed to turn off a Caller ID feature, such as, for example, by activating *-7-0. The deactivation of the off-hook visual message waiting indicator may be accomplished as part of the same operation employed to turn off Type II Caller ID, or may be accomplished as a separate operation.

In one example of the invention, the user may be engaged in a conversation with a second party, and may receive an indication via a call waiting feature that a third party is trying to contact the user. If the user elects not to interrupt the conversation with the second party, and the third party elects to leave a message for the user, then according to the invention, the user will be alerted by way of the visual message waiting indicator 113 that a message has been left for the user while still engaged in the conversation with the second party. In one example, the visual message waiting indicator 113 may be a conventional light emitting diode (LED) based device, as is known in the art. Another alerting mechanism may be, for example, a tone that is presented to a speaker, such as a speaker in an earpiece of the user's telephone, but is not presented to the far end party.

Alternatively, the visual message waiting indicator may comprise, either alone or in addition to the conventional LED, a display providing information relating to the stored message. For example, the display may provide call related information, such as caller ID data, associated with the third party, may provide an indication regarding the length of the stored message (e.g., "30 seconds"), may provide an indication regarding the time the message was received, and/or may provide a textual depiction of a portion of the stored message. This display may also be the display used to provide conventional caller ID information, if telephone 105 is so configured and if the user subscribes to such a service.

If the user does subscribe to a Caller ID service that includes Call Waiting (i.e., Type II Caller ID), then an advantage of the invention may simply be that the user is made aware of the fact that an incoming caller, who the user chose to ignore based, for example, on caller ID data associated with the incoming call, has decided to leave a message. If, on the other hand, the user does not subscribe to Caller ID, then the advantage of the invention may be greater as the visual message waiting indication provided to the user may be the first time the user is even aware that somebody else is trying to contact the user. Thus, even in the embodiment where the visual message waiting indicator is simply a conventional LED, the provision of the visual message waiting indicator signal during the off hook condition according to the invention is very advantageous as the user may otherwise be unaware of the attempted contact and may thus persist needlessly in a telephone call, web surfing experience, etc.

To facilitate the reception of the visual message waiting indicator signal by telephone 105, the central device 107 includes an interface unit 117, a controller 119, a message storage unit 121, and a visual message waiting indicator signal transmission unit 123, as well as conventional switch functionality 125. According to the invention, controller 119 will cause visual message waiting indicator transmission unit 123 to transmit a visual message waiting indicator signal via interface unit 117 and network 109 to telephone 105 to indicate the presence of a message in message storage unit 121.

Central device 107 may also include, according to one embodiment of the invention, an alerting unit 127 and an acknowledgement receive unit 129. Correspondingly, telephone 105 may include a muting mechanism 131 coupled to a conventional microphone 133 and a conventional speaker 135. Operationally, these elements may be employed to provide for controlled issuance of the visual message waiting indicator signal by the visual message waiting indicator signal transmission unit 123.

In one particular example, prior to issuance of the visual message waiting indicator signal, controller 119 directs alerting unit 127 to issue an alerting signal to telephone 105. In response to the alerting signal, muting mechanism 131 may mute transducers in telephone 105, such as microphone 133 and/or speaker 135 to minimize or eliminate disruption of the visual message waiting indicator signal by signals produced by the microphone 133 and to minimize or eliminate annoying sounds associated with the signal from emanating from the speaker 135.

This alerting and muting may be accomplished in a manner similar to that involved in conventional Type II Caller ID, as described in Bellcore specification GR-30-CORE, or may include aspects of U.S. Pat. No. 5,943,407, entitled Performance Enhancement of Tone Detection And FSK Detection Using Hybrid Echo Cancellation, and issued to Davis, et al., each of which is incorporated herein by reference. Such an approach may be implemented, for example, by adding a new parameter to the present Type II Multiple Data Message Format as described for example, in Bellcore documents TR-NWT-001188 and TR-NWT-000575, incorporated herein by reference.

Alternatively, a signaling scheme may be employed by which the visual message waiting indicator information is sent by the central location and received by the telephone during silent periods in an on-going telephone conversation.

In an alternative example, the alerting signal may elicit an acknowledgement signal from telephone 105 to inform the central device 107 that telephone 105 is ready and able to receive the visual message waiting indicator signal. This acknowledgement may also be configured in a manner similar to that utilized in the Type II Caller ID options described in the above references.

Figure 2:
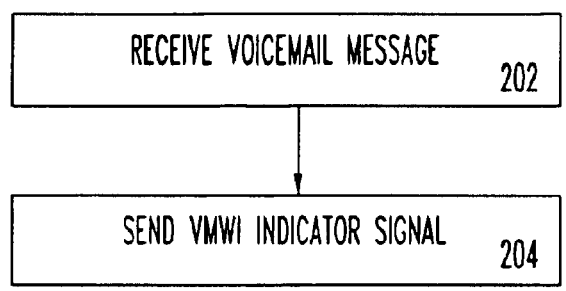
FIG. 2 is an exemplary simplified operational flowchart depicting the operation of a central device according to the invention.

FIG. 2 presents an operational flowchart depicting an embodiment of the invention. At step 202, the message storage unit 121 of central device 107 receives a voicemail message, such as from an incoming caller, and at step 204 the visual message waiting indicator signal transmission unit 123 of central device 107 issues a visual message waiting indicator signal via interface unit 117 and network 109 to telephone 105 when telephone 105 is in an off-hook condition.

Figure 3:
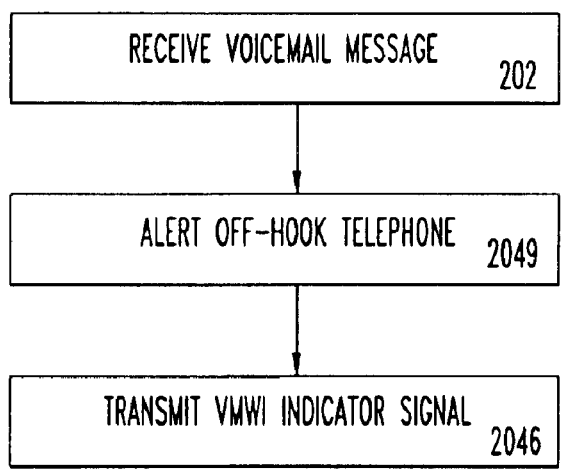
FIG. 3 is another exemplary simplified operational flowchart depicting the operation of a central device according to the invention.
Figure 4:
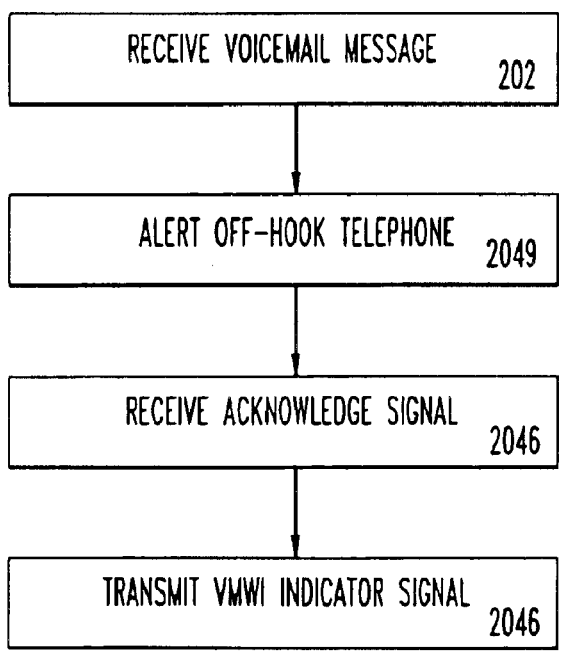
FIG. 4 is yet another exemplary simplified operational flowchart depicting the operation of a central device according to the invention.

FIG. 3 depicts an alternative operational flowchart, wherein step 204 from FIG. 2 includes the issuance of an alerting signal from alerting unit 127 at step 204a, and the transmission of the visual message waiting indicator signal at step 204b. FIG. 4 depicts another alternative wherein an acknowledgement signal is received at step 204c.

Figure 5:
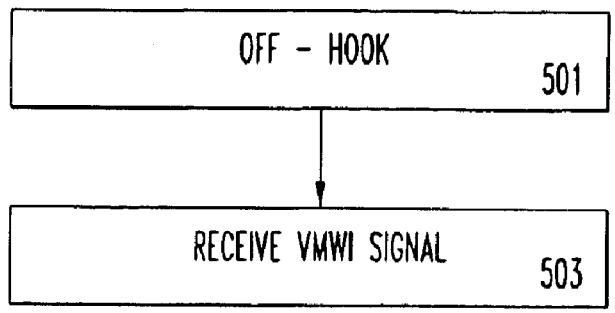
FIG. 5 is an exemplary simplified operational flowchart depicting the operation of a telephone according to the invention.
Figure 6:
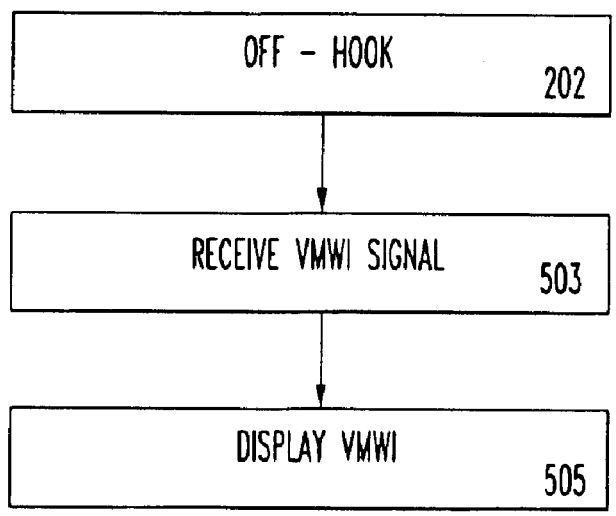
FIG. 6 is another exemplary simplified operational flowchart depicting the operation of a telephone according to the invention.

FIG. 5 provides an exemplary simplified operational flowchart for the telephone 105. At step 501, telephone 105 is in an off-hook condition, and at step 503 telephone 105 receives a visual message waiting indicator signal. This indicator may be used for any purpose by telephone 105, such as the typical purpose of displaying a visual message waiting indicator, as shown in the step 505 of the alternative embodiment of FIG. 6. Thus, according to this embodiment of the invention, even though telephone 105 is off hook, a user will be able to be made aware of the fact that a message has been left for the user at a central location, such as in message storage unit 121 of central device 107.

Figure 7:
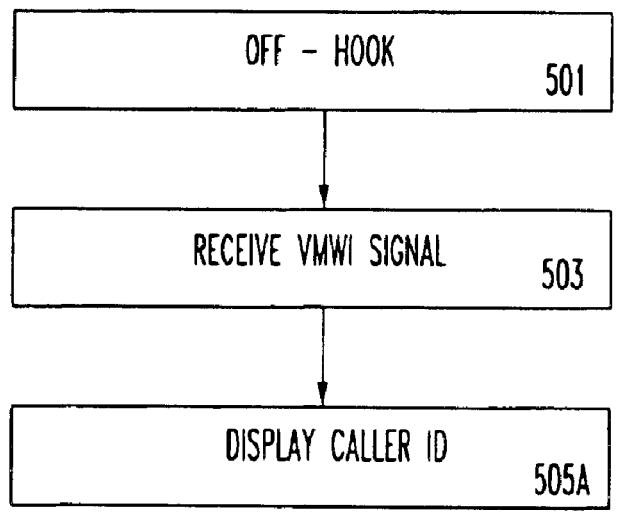
FIG. 7 is yet another exemplary simplified operational flowchart depicting the operation of a telephone according to the invention.

FIG. 7 provides an alternative example, wherein the display is not merely an indication that a message is stored in the message storage unit 121, but also includes an indication of the Caller ID data associated with the message leaving party. Thus, for example, a display, such as a conventional LCD display typically used to display Caller ID data associated with incoming calls, may be employed according to the invention to display a message, such as "MESSAGE FROM FRANK SMITH" or "MESSAGE FROM 610-123-4567". If necessary, based on limited display space, the display may be configured to toggle between "MESSAGE FROM" and "FRANK SMITH", or between "MESSAGE FROM" and "610-123-4567", depending on the elected implementation.

Alternatively, if there is more than one message stored, information relating to the plurality of messages may be provided to telephone 105 and displayed on the display, such as, for example, a continuing series of displays. For example, a first display may include "3 MESSAGES FROM" while each of the next three displays includes a name and/or telephone number of a party associated with each of the three messages. After the information identifying the party associated with the third message is displayed, the display will then proceed to the "3 MESSAGES FROM" display, and will continue in this cyclical fashion until the feature is disabled, until the user accesses one or more of the messages, or until an additional message is added and the display information is thus updated. This cycle may include additional information, such as the duration of a message or the time of a message.

Alternatively, the information received by and displayed by telephone 105 may include a portion of the stored message, such as the first few words of the stored message, to give the user an indication about the subject of the stored message. The display may thus also be configured particularly for this application, or may again take advantage of a conventional display and employ the above concepts to show portions of the message at appropriate times. If the message is originally recorded as a voice message, one way to achieve this alternative functionality is for the central device 107 to include a speech-to-text module that converts at least a portion of a stored voice message into text for transmission to the telephone 105. Such a module may be configured, for example, as a functional block within a processor, such as a digital signal processor.

Figure 8:
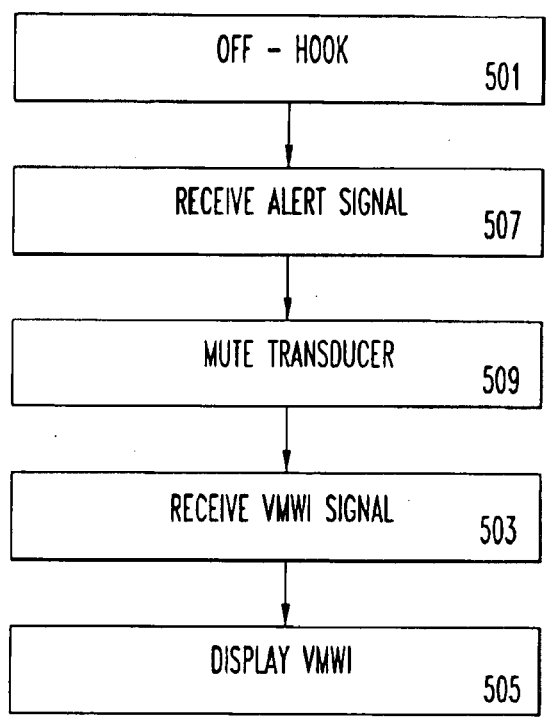
FIG. 8 is still another exemplary simplified operational flowchart depicting the operation of a telephone according to the invention.
Figure 9:
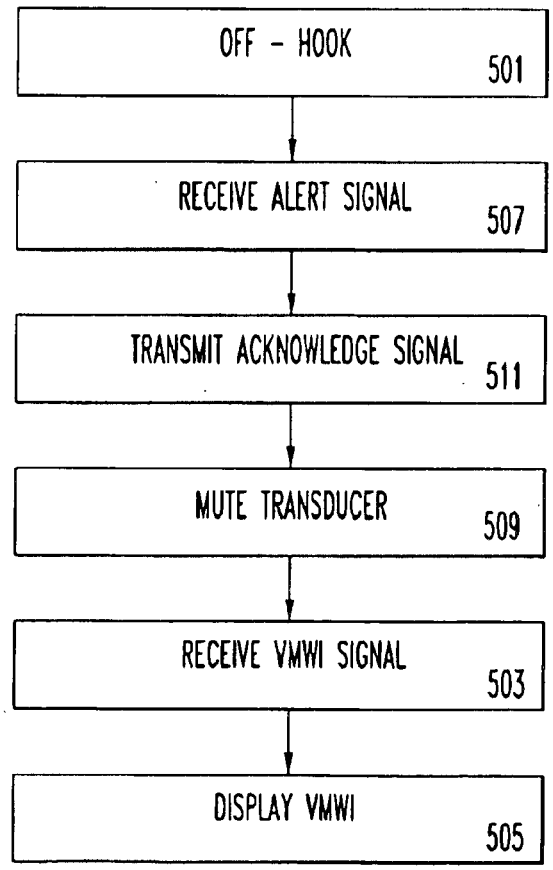
FIG. 9 is yet another exemplary simplified operational flowchart depicting the operation of a telephone according to the invention.

FIG. 8 provides another alternative flowchart that includes step 507, wherein telephone 105 receives an alert signal at step 507. At step 509, muting mechanism 131 mutes one or more transducers, such as microphone 133 or speaker 135, to facilitate the transfer of the visual message waiting indicator signal, which may include caller ID data, or may simply be an indicator signal. FIG. 9 provides yet another alternative flowchart whereby telephone 105 transmits an acknowledgement signal at step 511 prior to the muting step 509.

The invention thus provides various alternative embodiments by which a visual message waiting indicator signal, and/or data corresponding to a message or a message leaving party, may be transmitted from a central location to a telephone, and may be received by a telephone from a central location, even when the telephone is in an off-hook condition. Based on an understanding of these various embodiments, one of skill in the art is likely to conceive of alternative embodiments that are not specifically enumerated here, but that are clearly within the scope of the invention.

What is claimed is:

1. A method of providing a visual message waiting indicator signal to an off-hook telephone, comprising the steps of:

receiving a voicemail message at a central location; and sending, while said off-hook telephone is already participating in an established telephone call, a visual message waiting indicator signal from said central location and destined for said off-hook telephone, said visual message waiting indicator signal including call related information relating to a caller who left said voicemail message.

2. A method of providing a visual message waiting indicator signal to an off-hook telephone as recited in claim 1, wherein said step of sending said visual message waiting indicator signal comprises:

alerting said off-hook telephone, while said off-hook telephone is participating in an established telephone call, to an upcoming transmission of said visual message waiting indicator signal; and transmitting said visual message waiting indicator signal at a time period after said alerting step but while said off-hook telephone remains in said established telephone call.

3. A method of providing a visual message waiting indicator signal to an off-hook telephone as recited in claim 2, further comprising:

receiving an acknowledgement signal relating to a status of said off-hook telephone as being ready to receive said visual message waiting indicator signal prior to said transmitting step.

4. A method of providing a visual message waiting indicator signal to an off-hook telephone as recited in claim 3, wherein:

said time period of said transmitting step is based on receipt of said acknowledgment signal.

5. A method of providing a visual message waiting indicator signal to an off-hook telephone as recited in claim 3, wherein:

said predetermined time is associated with a muting period of said off-hook telephone.

6. A method of providing a visual message waiting indicator signal to an off-hook telephone as recited in claim 1, wherein said step of sending comprises:

transmitting caller ID data associated with a party that left said voicemail message.

7. The method of providing a visual message waiting indicator signal to an off-hook telephone according to claim 1, wherein:

said call related information is CallerID information.

8. The method of providing a visual message waiting indicator signal to an off-hook telephone according to claim 1, wherein said visual message waiting indicator signal further comprises:

a length of said voicemail message.

9. The method of providing a visual message waiting indicator signal to an off-hook telephone according to claim 1, wherein said visual message waiting indicator signal further comprises:

a textual depiction of a portion of said voicemail message.

10. A method of receiving a visual message waiting indicator signal in an off-hook telephone, comprising steps of:

transitioning to an off-hook condition;

establishing a telephone call while in said off-hook condition; and receiving a visual message waiting indicator signal during said established telephone call, said visual message waiting indicator signal including call related information relating to a caller who left a voicemail message.

11. A method of receiving a visual message waiting indicator signal in an off-hook telephone as recited in claim 10, further comprising:

displaying a visual message waiting indicator based on said received visual message waiting indicator signal.

12. A method of receiving a visual message waiting indicator signal in an off-hook telephone as recited in claim 11, wherein said displaying step comprises:

displaying caller ID data associated with a messaging party.

13. A method of receiving a visual message waiting indicator signal in an off-hook telephone as recited in claim 10, further comprising:

receiving an alert signal;

wherein said visual message waiting indicator signal is received at a time period after said alert signal is received.

14. A method of receiving a visual message waiting indicator signal in an off-hook telephone as recited in claim 10, further comprising:

transmitting an acknowledgement signal in response to said alert signal.

15. A method of receiving a visual message waiting indicator signal in an off-hook telephone as recited in claim 14, wherein:

said time period is based on receipt of said acknowledgement signal.

16. A telephone, comprising:

a visual message waiting indicator; and an interface unit adapted to couple said telephone to a network, such that said telephone is in an off-hook condition when coupled to said network and engaged in a communication activity, and is in an on-hook condition when coupled to said network and not engaged in a communication activity, wherein said interface unit is adapted to receive a visual message waiting indicator signal when said telephone is participating in an established telephone call and in said off-hook condition, said visual message waiting indicator signal including call related information relating to a caller who left a voicemail message.

17. A telephone as recited in claim 16, further comprising:

a muting mechanism adapted to mute a transducer in association with the receipt of said visual message waiting indicator signal.

18. A telephone as recited in claim 17, wherein said transducer comprises:

a microphone.

19. A telephone as recited in claim 17, wherein said transducer comprises:

a speaker.

20. A telephone as recited in claim 17, wherein:

said muting mechanism is adapted to mute said transducer in response to an alert signal.

21. A telephone switch, comprising:

a message storage unit adapted to receive a voicemail message associated with a telephone when said telephone is in an off-hook condition; and a visual message waiting indicator signal transmission unit adapted to transmit a visual message waiting indicator signal to said telephone while said telephone is participating in an established telephone call while in an off-hook condition, said visual message waiting indicator signal including call related information relating to a caller who left said voicemail message.

22. A telephone switch as recited in claim 21, further comprising:

an alerting unit adapted to transmit an alerting signal to said telephone prior to transmitting said visual message waiting indicator signal.

23. A telephone switch as recited in claim 22, further comprising:

an acknowledgement receiving unit adapted to receive an acknowledgement signal in response to said alerting signal and prior to transmitting said visual message waiting indicator signal.

* * * * *